United States Patent
Gaffield et al.

(10) Patent No.: US 10,473,072 B2
(45) Date of Patent: Nov. 12, 2019

(54) FUEL PUMP LOCKING ASSEMBLY

(71) Applicant: FORD GLOBAL TECHNOLOGIES, LLC, Dearborn, MI (US)

(72) Inventors: John Thomas Gaffield, Ann Arbor, MI (US); Christopher Michael Lilly, Novi, MI (US); Lawrence J Liposky, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1508 days.

(21) Appl. No.: 13/868,131

(22) Filed: Apr. 23, 2013

(65) Prior Publication Data
US 2014/0312613 A1    Oct. 23, 2014

(51) Int. Cl.
*F02M 37/10*     (2006.01)
*B60K 15/03*    (2006.01)

(52) U.S. Cl.
CPC .......... *F02M 37/103* (2013.01); *B60K 15/03* (2013.01); *B60K 2015/03243* (2013.01); *B60K 2015/03453* (2013.01)

(58) Field of Classification Search
CPC ................. F02M 37/103; B60K 15/03; B60K 2015/03243; B60K 2015/03453
USPC ....... 285/90, 308, 411, 413–415, 924, 139.1, 285/142.1, 205–206, 208
See application file for complete search history.

(56) References Cited

U.S. PATENT DOCUMENTS

| | | | | |
|---|---|---|---|---|
| 821,536 A | * | 5/1906 | Price | F16L 55/178 285/413 |
| 1,001,122 A | * | 8/1911 | Charmois | E03C 1/23 285/206 |
| 1,795,811 A | * | 3/1931 | White | F16L 27/06 285/266 |
| 1,802,690 A | * | 4/1931 | White | F16L 27/06 285/266 |
| 1,803,820 A | * | 5/1931 | White | F16L 27/06 285/266 |
| 3,179,444 A | * | 4/1965 | Lansky | F16J 13/12 285/308 |
| 3,380,761 A | * | 4/1968 | Van Devender, Jr. | F16L 37/002 285/308 |
| 3,539,272 A | * | 11/1970 | Howard | F02M 37/103 222/333 |
| 3,592,490 A | * | 7/1971 | Harding | F16L 5/00 285/331 |
| 3,881,201 A | * | 5/1975 | Richards | E03C 1/22 285/206 |
| 4,590,964 A | * | 5/1986 | Beardmore | B67D 7/68 137/565.24 |
| 4,878,695 A | * | 11/1989 | Whitham | F16L 37/252 285/292.1 |

(Continued)

*Primary Examiner* — Anna M Momper
*Assistant Examiner* — Fannie C Kee
(74) *Attorney, Agent, or Firm* — Joseph E. Root

(57) ABSTRACT

A fuel pump to fuel tank attachment assembly for a vehicle includes a retainer ring firmly attached to a portion of the fuel tank. The retainer ring is formed of the same material as the material of the fuel tank. A lock ring is positioned over, and secured to the retainer ring. A flange of the fuel pump is positioned and clamped between the retainer ring and the lock ring. The retainer ring and the lock ring circumferentially engage the flange of the fuel pump, in the mounted position of the assembly.

1 Claim, 3 Drawing Sheets

(56) References Cited

U.S. PATENT DOCUMENTS

| | | | | |
|---|---|---|---|---|
| 5,074,598 A | * | 12/1991 | Masseth | F16L 19/005 |
| | | | | 285/39 |
| 6,085,779 A | * | 7/2000 | Eriksson | E03F 5/0408 |
| | | | | 137/362 |
| 6,533,288 B1 | * | 3/2003 | Brandner | B60K 15/03 |
| | | | | 220/304 |
| 6,733,045 B2 | * | 5/2004 | Harrington | F16L 37/252 |
| | | | | 285/143.1 |
| 7,032,253 B2 | * | 4/2006 | Colpitts | A47K 1/14 |
| | | | | 4/287 |
| 7,128,345 B2 | * | 10/2006 | Bartholoma | F16L 5/027 |
| | | | | 285/137.11 |
| 7,784,637 B2 | * | 8/2010 | Osborne | F16J 15/025 |
| | | | | 220/562 |
| 8,043,497 B2 | * | 10/2011 | Silverstein | E03F 5/0407 |
| | | | | 210/164 |
| 2002/0108658 A1 | * | 8/2002 | Ootaka | B62J 35/00 |
| | | | | 137/565.17 |
| 2004/0021271 A1 | * | 2/2004 | Tratnik | F02M 37/103 |
| | | | | 277/616 |
| 2007/0062841 A1 | * | 3/2007 | Nakamura | B60K 15/03177 |
| | | | | 206/562 |

* cited by examiner

FUEL PUMP LOCKING ASSEMBLY

TECHNICAL FIELD

Embodiments of the present disclosure generally relate to fuel pumps for automotive vehicles, and, more specifically, to assemblies for locking fuel pumps to fuel tanks in automotive vehicles.

BACKGROUND

Modern automotive vehicles require a fuel pump to move fuel from the tank to the fuel-injection system. Typically, fuel pumps and electrically powered and located inside the fuel tank.

Medium and heavy-duty vehicle fuel tanks are generally aluminum or aluminized steel for diesel-powered vehicles and aluminized steel for gasoline, based on the manner in which each of those materials interacts with the fuel. Typically, some type of retainer ring secures the fuel pump to the fuel tank, and a lock ring clamps and secures the fuel pump to the retainer ring.

Working with aluminum tanks presents a number of problems. First, the use of steel for the retainer ring raises issues of galvanic corrosion. On the other hand, stamped aluminum is too rigid to be used for clamping the fuel pump to the retainer ring, an action requiring some flexibility and springiness.

Therefore, a need exists for an assembly for locking a fuel pump to a fuel tank of a vehicle, particularly a locking assembly that can easily attach and secure the fuel pump to the fuel tank, while substantially avoiding galvanic corrosion.

SUMMARY

One aspect of the disclosure is a fuel pump attachment assembly for securing a fuel pump carried in an aperture formed in a vehicle fuel tank. That assembly generally comprises a retainer ring and a lock ring, with the fuel pump being carried on the former. The retainer ring includes a lower flange, fitted into the aperture and carrying the fuel pump, and an upper flange, integral with the lower flange and fixed to the periphery of the aperture. The retainer ring is machined from the same material as that from which the fuel tank is formed. The lock ring overlies the retainer ring and clamps the fuel pump to the lower flange, the lock ring being secured to the retainer ring.

A further aspect of the disclosure is a fuel pump attachment assembly for securing a fuel pump carried in an aperture formed in a vehicle fuel tank. The assembly comprises a retainer ring and a lock ring, the retainer ring being machined from the same material as that of the fuel tank. The retainer ring includes a lower flange, generally L-shaped in form, having an upstanding portion fitted into the aperture, and a horizontal portion extending into the aperture from the upstanding portion, the horizontal portion carrying the fuel pump. The retainer ring also includes an upper flange, generally L-shaped in form, having a horizontal portion carried on and fixed to the surface of the fuel tank around the periphery of the aperture, the horizontal portion being integral with the lower flange, and an upstanding portion, encircling the aperture and including fastener receiving holes adapted to receive selected fasteners. The lock ring overlies the retainer ring. It is generally Z-shaped, and it includes an upper portion, generally horizontal, carried on the upper surface of the upstanding portion of the upper flange, a lower portion, generally horizontal and carried on the horizontal portion of the upper flange and adapted to bear against the fuel pump flange; and a connecting portion, integral with and extending between the lock ring upper and lower portions, generally following the contour of the retainer ring. The lock ring is secured to the retainer ring upper flange with fasteners extending through lock ring fastener holes and into the upper flange fastener receiving holes, thereby clamping the fuel pump flange to the retainer ring lower flange horizontal portion.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 3 (b) is another schematic sectional view of the assembly of FIG. 1, depicting a drainage passage formed between a retainer ring and a lock ring of the assembly, according to an embodiment of the present disclosure.

DETAILED DESCRIPTION OF ILLUSTRATIVE EMBODIMENTS

The following detailed description illustrates aspects of the disclosure and its implementation. This description should not be understood as defining or limiting the scope of the present disclosure, any such definition or limitation being solely contained in the claims appended hereto. Although the best mode of carrying out the invention has been disclosed, those in the art will recognize that other embodiments for carrying out or practicing the invention are also possible.

A fuel pump transports fuel from the vehicle fuel tank to the engine. The wholesale adoption of electronic fuel injection systems rendered mechanical pumps generally obsolete, and thus most vehicles now employ an electrical fuel pump, mounted inside the fuel tank. Such a pump delivers fuel under high pressure to the electronic fuel injection system. Some vehicles incorporate two electrical pumps, a low pressure/high volume supply pump positioned in the fuel tank operating in tandem with a low-pressure, high-volume pump positioned near the engine.

The present disclosure provides an assembly for attaching a fuel pump to a fuel tank of a vehicle. The components of the assembly are substantially compatible with the material of the fuel tank, and can be easily mounted over, and attached to the fuel tank by welding or brazing. Further, the assembly significantly avoids galvanic corrosion to the different portions of the fuel tank and the fuel pump, while being mounted over the fuel tank shell.

Figure 1:
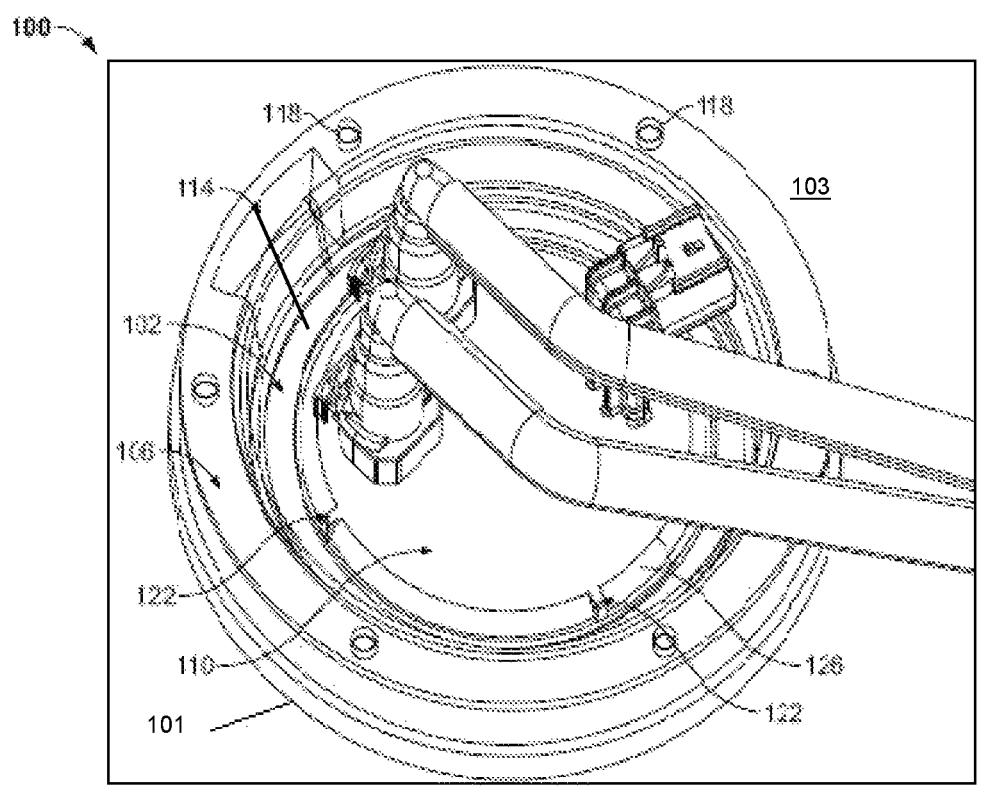
FIG. 1. is a pictorial view of vehicle fuel pump locking assembly, according to an embodiment of the present disclosure.
Figure 2:
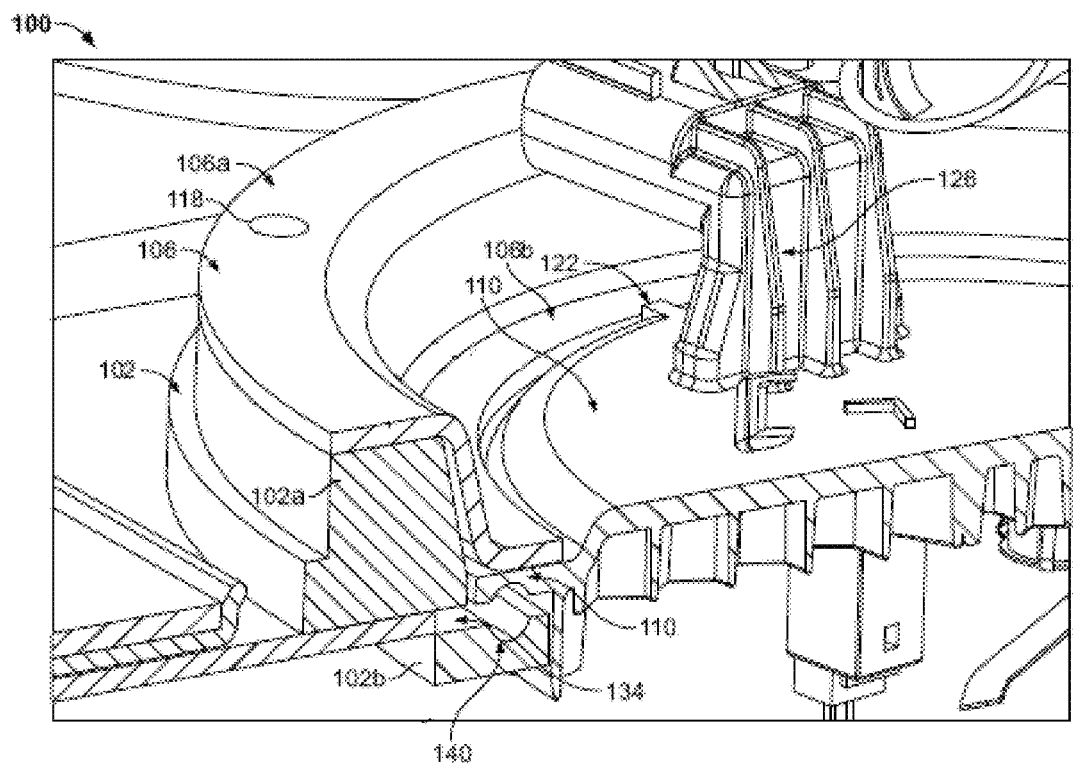
FIG. 2 is a perspective sectional view of the assembly of FIG. 1.

FIG. 1 is a perspective view of an assembly 100 for locking a fuel pump to a fuel tank of a vehicle, and FIG. 2 is a detailed sectional view of the same components. These figures should be viewed together to understand the locking assembly depicted in them. As can be seen in both figures, an aperture 101 is formed in the fuel tank 103, sized to accept the fuel pump 126, as discussed below. Aperture 101 could be formed on any convenient surface of the fuel tank 103, but the aperture is generally located on the top surface of the tank, avoiding any possibility of leakage, and also placing the fuel pump 126 in a convenient position for extending the fuel line to the fuel injection system (neither shown).

As best seen in FIG. 2, the retainer ring 102 includes two portions, an upper flange 102 (*a*), and a lower flange 102 (*b*). Upper flange 102 (*a*) is dimensioned to fit over the periphery of aperture 101, while lower flange 102 (*b*) fits inside that aperture. Both flanges of the retainer ring 102 are generally L-shaped, each having an upstanding portion and a horizontal portion, with the upstanding portion of the lower flange 102 (*b*) being integral with the inner edge of the horizontal portion of upper flange 102 (*a*).

Retainer ring 102 is secured in place over aperture 101. In the illustrated embodiment, retainer ring 102 is secured by welding, but other embodiments employ other securing means, such as brazing or soldering.

Fuel pump 126 fits through the opening in retainer ring 102, extending into the fuel tank 103. A lip or flange 110 extends outward from the body of fuel pump 126 to rest on the upper side of lower flange 102 (*b*). It being advantageous to create a seal between fuel pump 126 and lower flange 102 (*b*), a sealing element, such as O-ring 140 can be provided between those two elements. In some embodiments, a groove or slot can be formed in one or both surfaces to accommodate O-ring 140. Those in the art will understand the requirements for establishing a seal in this location, and such persons will be able to choose from among the wide range of devices known and available to the art for this purpose. In some embodiments, gasket material could be employed to create a seal, while in other implementations, other materials can be used. Care should be employed in selecting seals that can withstand long-term exposure to gasoline or diesel fuel, as applicable to a given implementation.

A lock ring 106 is positioned over the retainer ring 102, arranged to clamp fuel pump flange 110 to retainer ring lower flange 102 (*b*). Lock ring 106 is generally in the form of the Z, with upper and lower horizontal portions adapted to fit over upper flange 102 (*a*) and lower flange 102 (*b*), respectively. The connecting portion of the Z-shape is adapted to generally follow the inner contour of the upright portion of upper flange 102 (*a*), dimensioned so that when the lock ring is flush with the top of upper flange 102 (*a*), the lower horizontal portion of the lock ring exerts sufficient force on the upper surface of fuel pump 126 to clamp the pump in position. Securing lock ring 106 to retainer ring 102 can proceed by any of a number of methods known to the art. Here, through holes 118 are formed in lock ring 106, which can align with threaded holes formed in retainer ring 102 to accept screws to complete the fastening.

If desired, lock ring 106 or retainer ring 102 can be configured to position fuel pump 126 in a specific orientation with respect to the fuel tank 103. In the illustrated embodiment, an alignment arrangement 122 consists of a tab on the upper surface of fuel pump 126 fitting into a slot formed in the inner surface of lock ring 106. Many other arrangements will occur to those of skill in the art.

Multiple tabs 122 are provided over the upper surface of the flange 110, and these tabs can be used to position the flange 110 in a specific configuration with respect to the fuel tank shell. The retainer ring 102 has a cut-out portion, a notch 114, which facilitates access to the tabs 122. Further, a vent (not shown) is provided within the lock ring 106. That vent aligns with the notch 114 within the retainer ring 102, and creates a drainage passage configured to drain liquid from the flange 110 to the retainer ring 102 of the assembly. This will be explained in more detail in conjunction with subsequent figures.

As best seen in FIG. 1, retainer ring 102 is provided with a notch 114 allowing liquid to drain from the area bounded by the retainer ring 102 to drain liquid from the fuel pump 126. Specifically, the notch 114 aligns with a vent within the lock ring 106 (not shown), to create a drainage passage between the flange 110 and the retainer ring 102. Through that drainage passage, any liquid which accumulates within the retainer ring may drain out easily. Further, as described earlier, the notch 114 provides ease of access to the tabs 122 of the flange 110, to orient the flange 110 in a specific configuration.

Preferably, ring 102 is formed of the same material as is the fuel tank which facilitates attaching the retainer ring 102 to the fuel tank shell by welding or brazing. When fuel tank 103 is employed as a gasoline tank, the retainer ring 102 and the fuel tank 103 may preferably be formed of aluminum. Conversely, when the fuel tank 103 is a diesel tank, stainless steel may be preferred.

In some embodiments, the retainer ring 102 is coated with the material that the fuel tank is formed of That coating provides compatibility between the retainer ring 102 and fuel tank 103, allowing better performance welding or brazing in that instance, the core of retainer ring 102 could be formed of any suitable desired material. Further, it has been found preferable to machine retainer ring 102, which further facilitates attaching retainer ring 102 to the fuel tank. The machined surface also provides improved sealing between the retainer ring 102 and lock ring 106.

Lock ring 106 can be formed of the same material as used for retainer ring 102 and the fuel tank 103. As noted above, that material is preferably either aluminum or stainless steel, though other suitable metals or metallic alloys may also be contemplated in certain embodiments.

Figure 3:
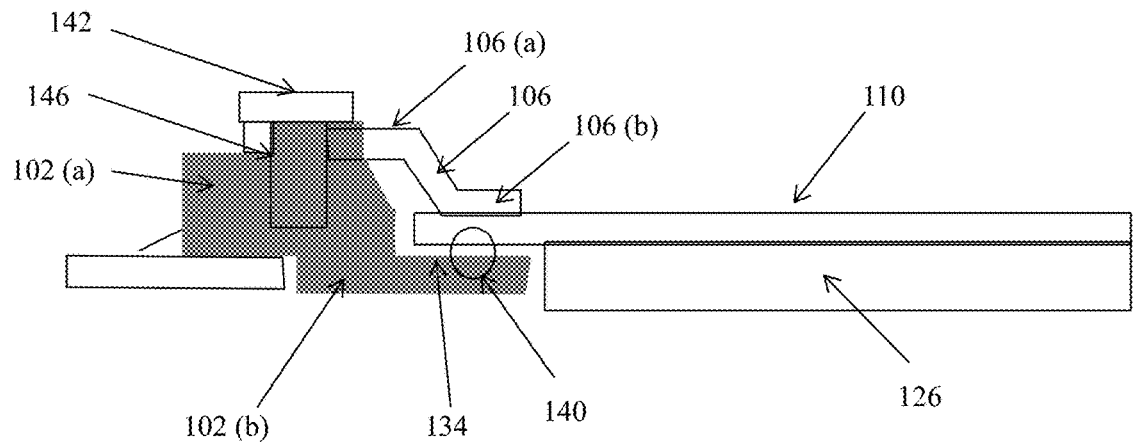
FIG. 3 (a) is a schematic sectional view of the assembly of FIG. 1, taken along a notch of the retainer ring of the assembly, according to an embodiment of the present disclosure.
Figure 3:
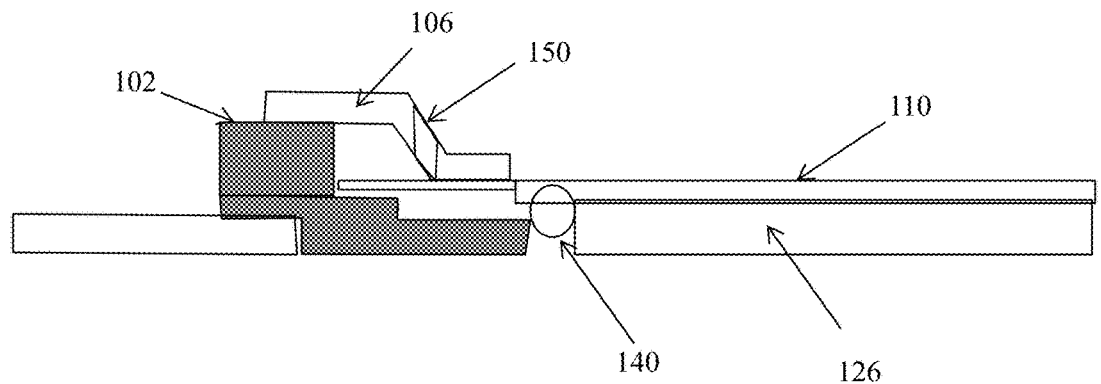

FIG. 3 (*a*) depicts a sectional view of the assembly 100 of FIG. 1, taken through the notch 114 (shown in FIG. 1) of the retainer ring 102. As shown, the upper flange 102 (*a*) of the retainer ring is attached (welded or brazed) to the fuel tank 103, while lower flange 102 (*b*) extends into aperture 101. The top surface 134 of lower flange 102 (*b*) is positioned beneath the flange 110 of the fuel pump 126. The lock ring 106, as shown, clamps the flange 110 to the retainer ring lower flange 102 (*b*). When positioned, the lower portion 106 (*b*) of the lock ring 106 engages the flange 110, and the upper portion 106 (*a*) engages the upper flange 102 (*a*) of the retainer ring 102. Mechanical fasteners, such as threaded screws 142, extend through a set of through-holes within the lock ring 106, and into corresponding threaded holes 146 of the upper flange 102 (*a*) of the retainer ring 102. As noted above, lock ring 106 is dimensioned so that when screws 142 are tightened, forcing lock ring upper portion 106 (*a*) against the upper surface of upper flange 102 (*a*) the lock ring 106 exerts a clamping force on flange 110. This clamping action secures fuel pump 126 in position. Further, the lock ring 106 is positioned at an offset to the retainer ring 102

FIG. 3 (*b*) is another cross-sectional view of the assembly of FIG. 1. A vent 150 is provided within the lock ring 106. The vent 150 passes through the lock ring 106, allowing fluid, either liquid or air, to move into and out of the area beneath the lock ring 106. In some embodiments, vent 150 is aligned with notch 114 to facilitate liquid drainage away from the fuel pump assembly.

When assembled and mounted in the fuel tank 103, the assembly of the present disclosure firmly secures the fuel pump 126 in position. The cooperative action of retainer ring 102 and lock ring 106 clamp fuel pump 126 in position, and the compression action against O-ring 140 ensures a liquid-tight seal around the fuel pump flange 110. Furthermore, the fact that retainer ring 102 is selected to be formed from the same material as the fuel tank 103 facilitates welding and avoids galvanic corrosion. Also, the components of the assembly are designed to absorb and stand sufficiently high strength/load, in the mounted position of the assembly over the fuel pump.

Though the assembly of the present disclosure, for locking a fuel pump to a fuel tank of a vehicle has been explained in context of an electrically driven fuel pump, the assembly may also find its application in conjunction with any other types of fuel pumps for vehicles, including mechanical fuel pumps.

Although the current invention has been described comprehensively, in considerable details to cover the possible aspects and embodiments, those skilled in the art would recognize that other versions of the invention are also possible.

What is claimed is:

1. In an automotive vehicle including a fuel pump and a fuel tank, the fuel pump being carried in an aperture formed in the fuel tank, the improved fuel pump comprising a fuel pump attachment assembly, including:
   a retainer ring, having
      a lower flange, generally L-shaped in form, having an upstanding portion adapted to be fitted into the aperture and a horizontal portion adapted to extend into the aperture from the upstanding portion, the horizontal portion being adapted to carry the fuel pump;
      an upper flange, generally L-shaped in form, having
         a horizontal portion adapted to be carried on and fixed to a surface of the fuel tank around the periphery of the aperture, the horizontal portion being integral with the lower flange, and
         an upstanding portion, encircling the aperture and including fastener receiving holes adapted to receive selected fasteners;
      the retainer ring being machined from the same material as that from which the fuel tank is formed;
   a lock ring overlying the retainer ring, the lock ring being generally Z-shaped and including
      an upper portion, generally horizontal, carried on an upper surface of the upstanding portion of the upper flange;
      a lower portion, adapted to bear against a fuel pump flange; and
      a connecting portion, integral with and extending between the lock ring upper and lower portions, generally following a contour of the retainer ring;
   wherein the lock ring is secured to the retainer ring upper flange with fasteners extending through lock ring fastener holes and into the upper flange fastener receiving holes, adapted to thereby clamp the fuel pump flange to the retainer ring lower flange horizontal portion.

* * * * *